United States Patent
Han et al.

(10) Patent No.: US 10,020,892 B2
(45) Date of Patent: Jul. 10, 2018

(54) APPARATUS AND METHOD OF IN-PHASE/QUADRATURE SEPARATED DUAL MULTICARRIER TRANSMISSION FOR COHERENT OPTICAL TRANSMISSION

(71) Applicant: INDUSTRY-ACADEMIC COOPERATION FOUNDATION, YONSEI UNIVERSITY, Seoul (KR)

(72) Inventors: Sang Kook Han, Seoul (KR); Sang Min Jung, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/396,912

(22) Filed: Jan. 3, 2017

(65) Prior Publication Data

US 2017/0195060 A1 Jul. 6, 2017

(30) Foreign Application Priority Data

Jan. 4, 2016 (KR) .................. 10-2016-0000401

(51) Int. Cl.
*H04B 10/00* (2013.01)
*H04B 10/54* (2013.01)
*H04L 27/26* (2006.01)

(52) U.S. Cl.
CPC ......... *H04B 10/54* (2013.01); *H04L 27/2628* (2013.01)

(58) Field of Classification Search
CPC ............................ H04B 10/54; H04L 27/2628
USPC ......................................................... 398/186
See application file for complete search history.

(56) References Cited

U.S. PATENT DOCUMENTS

| | | | | |
|---|---|---|---|---|
| 5,559,506 | A * | 9/1996 | Leitch | H03M 13/2703 340/7.43 |
| 2004/0028146 | A1* | 2/2004 | Winkler | H04L 27/2626 375/260 |
| 2007/0026833 | A1* | 2/2007 | Kuchi | H04L 25/03299 455/296 |
| 2010/0166089 | A1 | 7/2010 | Seki | |
| 2016/0105245 | A1* | 4/2016 | Cai | H04B 10/613 398/208 |
| 2016/0254939 | A1* | 9/2016 | Miyazaki | H04L 27/3818 375/341 |

FOREIGN PATENT DOCUMENTS

| | | |
|---|---|---|
| KR | 10-2001-0071931 A | 7/2001 |
| KR | 10-2011-0005575 A | 1/2011 |

(Continued)

OTHER PUBLICATIONS

Communication dated Aug. 28, 2017 from a Korean Patent Office in a counterpart Korean Patent Application No. 10-2016-0000401.

(Continued)

*Primary Examiner* — Juan A Torres
(74) *Attorney, Agent, or Firm* — Sughrue Mion, PLLC (57) ABSTRACT

Provided is an apparatus and method for in-phase (I)/quadrature (Q) separated dual multicarrier transmission in a coherent optical transmission system. A multicarrier transmission apparatus includes a carrier generator configured to generate a plurality of multicarrier signals; and a modulator configured to independently modulate input data with respect to an I component and a Q component of an optical carrier using the generated plurality of multicarrier signals.

9 Claims, 7 Drawing Sheets

(56) References Cited

FOREIGN PATENT DOCUMENTS

KR  1020110044453 A  4/2011
WO     2007025346 A  3/2007

OTHER PUBLICATIONS

Jung, Sun-Young et al., "IQ Channel Separated Baseband OFDM Optical Transmission Using Orthogonal Polarizations in IM/DD System", Journal of Lightwave Technology, Jul. 1, 2014, pp. 2392-2398, vol. 32, No. 13.
Fatadin, Irshaad, et al., "Compensation of Quadrature Imbalance in an Optical QPSK Coherent Receiver," IEEE Photonics Technology Letters 2008, Oct. 15, 2008, vol. 20, No. 20, pp. 1733-1735.
Zhu, J., et al., "RF-Pilot Phase Noise Compensation for Long-Haul Coherent Optical OFDM Systems," IEEE 14th Canadian Workshop on Information Theory (CWIT), Sep. 14, 2015, pp. 127-130.
Communication dated Mar. 15, 2017 from the Korean Patent Office in counterpart application No. 10-2016-0000401.

* cited by examiner

APPARATUS AND METHOD OF IN-PHASE/QUADRATURE SEPARATED DUAL MULTICARRIER TRANSMISSION FOR COHERENT OPTICAL TRANSMISSION

TECHNICAL FIELD

At least one example embodiment relates to technology for modulating an input signal by independently using an in-phase (I) component and a quadrature (Q) component of a single optical carrier to transmit a multicarrier-based radio frequency (RF) signal in a coherent optical transmission communication system, and more particularly, to technology for decreasing a time delay induced effects between I and Q channels occurring in response to an optical transmission and a phase effect according thereto.

RELATED ART

As a wave property that enables an interference phenomenon to be well observable, if a phase of light constantly varies with respect to a space and time, it is referred to as coherence communication. Based on thereon, a coherent optical transmission scheme may be regarded as communication technology of dreams for $21^{st}$ Century. A feature of the coherent optical transmission scheme lies in that a signal is transmitted based on variation in an amplitude, a frequency, and a phase of light instead of using the intensity of light.

In many existing optical transmission schemes, a transmitter modulates an output light wave of a laser to an electrical signal and transmits the modulated signal, and a receiver directly emits a received optical signal to an optical diode and detects a signal based on a change in a current magnitude. This transmission scheme is referred to as an intensity modulation/direct detection (IM/DD) transmission scheme.

In the recent times, a new transmission scheme is proposed to enhance the transmission capacity of the existing IM/DD transmission scheme. The new transmission scheme is a scheme of modulating and transmitting a frequency or a phase of carrier as in a wireless or ultra high frequency transmission scheme, and detecting a signal using a homodyne detection or a heterodyne detection.

In the optical transmission scheme, a phase coherence of an optical carrier plays an important role. Thus, this invention is referred to as a coherent communication scheme and an optical communication system using this invention is referred to as a coherent optical communication system. As features of the technology, it is possible to enhance a receive sensitivity compared to the DD transmission scheme by intensity modulation according to the related art. Using the enhancement, it is possible to extend a transmission distance or to enhance a transmission capacity.

The general coherent optical communication system transmits and receives a signal by separating a real number value and an imaginary number value of a multicarrier signal in a complex form and by separating an in-phase (I) component and a quadrature (Q) component of an optical carrier and modulating the signal relative thereto.

Here, the I component and the Q component of the optical carrier are distinguished from each other based on a 90-degree phase difference of the optical carrier. However, since a frequency of the optical carrier uses a terahertz (THz) unit, a radio frequency (RF) delay of an electrical signal modulated with respect to the I component and the Q component leads to a critical performance degradation even with a very small error. Accordingly, devices used for the coherent optical transmission system need to minimize an RF time delay error, which causes relatively high device complexity and cost.

RELATED ARTS (Patent Document) Korean Patent Publication NO. 10-2001-0071931
(Patent Document) Korean Patent Publication NO. 10-2011-0005575

DETAILED DESCRIPTION

Technical Subjects

At least one example embodiment is to decrease the effect by a time delay and a phase difference occurring in an in-phase (I) component and a quadrature (Q) component in a coherent optical transmission system.

At least one example embodiment is to reduce technical requirements of an optical transmission and reception module required at the multicarrier coherent optical transmission disclosure.

At least one example embodiment is to control interference between an I component and a Q component of an optical carrier by providing transmission and reception technology through digital signal processing.

At least one example embodiment is to apply to a next generation optical subscriber network system based on coherent optical transmission.

Solutions

According to an example embodiment, there is provided a multicarrier transmission apparatus including a carrier generator configured to generate a plurality of multicarrier signals; and a modulator configured to independently modulate input data with respect to an in-phase (I) component and a quadrature (Q) component of an optical carrier using the generated plurality of multicarrier signals.

The carrier generator is configured to generate the plurality of multicarrier signals in a real number form by applying a Hermitian symmetry.

The carrier generator is configured to apply the Hermitian symmetry by performing inverse fast Fourier transform (IFFT) processing on a conjugate complex value acquired by performing quadrature amplitude modulation (QAM) mapping on a plurality of multicarrier signals converted in parallel.

The modulator is configured to modulate the input data by inserting a radio frequency (RF) tone separate from the I component and the Q component in the case of modulating the generated plurality of multicarrier signals.

In the modulated plurality of multicarrier signals, a phase variation of the transmitted optical carrier is compensated for at a reception side using a power ratio to the inserted RF tone.

According to an example embodiment, there is provided a multicarrier transmission apparatus including a first processor configured to generate first modulation data by modulating at least a portion of input data by applying a first carrier signal in an independent real number form to an I component of an optical carrier; a second processor configured to generate second modulation data by modulating at least a portion of the input data by applying a second carrier signal in an independent real number form to a Q component of the optical carrier; and an RF tone inserter configured to insert an RF tone by adding the RF tone to the first modulation data and the second modulation data.

A reception side compensates for a phase variation of the transmitted optical carrier associated with the first modulation data and the second modulation data using a power ratio to the RF tone.

According to an example embodiment, there is provided a multicarrier transmission method including generating a plurality of multicarrier signals; and independently modulating input data with respect to an I component and a Q component of an optical carrier using the generated plurality of multicarrier signals.

The generating of the plurality of multicarrier signals includes generating the plurality of multicarrier signals in a real number form by applying a Hermitian symmetry.

The generating of the plurality of multicarrier signals in the real number form includes performing IFFT processing on a conjugate complex value acquired by performing QAM mapping on a plurality of multicarrier signals converted in parallel.

The modulating of the input data includes modulating the input data by inserting an RF tone separate from the I component and the Q component in the case of modulating the generated plurality of multicarrier signals.

In the modulated plurality of multicarrier signals, a phase variation of the transmitted optical carrier is compensated for at a reception side using a power ratio to the inserted RF tone.

According to an example embodiment, there is provided a program including a set of instructions configured to generate a plurality of multicarrier signals; and a set of instructions configured to independently modulate input data with respect to an I component and a Q component of an optical carrier using the generated plurality of multicarrier signals.

Effects

According to example embodiments, it is possible to decrease the effect by a time delay, a channel gain difference and a phase difference occurring in an in-phase (I) component and a quadrature (Q) component in a coherent optical transmission system.

According to example embodiment, it is possible to reduce technical requirements of an optical transmission and reception module required at the multicarrier coherent optical transmission disclosure.

According to example embodiment, it is possible to control interference between an I component and a Q component of an optical carrier by providing transmission and reception technology through digital signal processing.

According to example embodiment, it is possible to apply to a next generation optical subscriber network system based on coherent optical transmission.

BEST MODE

The following specific structural or functional description of example embodiments according to the concept of the disclosure disclosed herein is provided as an example only to describe the example embodiments and the example embodiments according to the concept of the disclosure may be embodied in various forms and are not construed as being limited to the example embodiments described herein.

Various modifications and alterations may be made to the example embodiments according to the concept of the disclosure and thus, the example embodiments are illustrated in the drawings and are described in detail herein. However, the example embodiments according to the concept of the disclosure are not to be limited to specific disclosure and should be understood to include all changes, equivalents, or replacements within the spirit and technical scope of the disclosure.

Although terms of "first", "second", etc., are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected" or "coupled" to another component, a third component may be "connected" or "coupled" between the first and second components, although the first component may be directly connected or coupled to the second component. On the contrary, it should be noted that if it is described that one component is "directly connected" or "directly coupled" to another component, a third component may be absent. Expressions describing a relationship between components, for example, "between", directly between", or "directly neighboring", etc., should be interpreted to be alike.

The terms used herein are used to simply explain the example embodiments and not to limit the disclosure. As used herein, the singular forms are intended to include the plural forms as well, unless the context clearly indicates otherwise. It should be further understood that the terms "comprises/includes" or "has," when used in this specification, specify the presence of stated features, integers, steps, operations, elements, components or a combination thereof, but do not preclude the presence or addition of one or more other features, integers, steps, operations, elements, components, and/or combinations thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the example embodiments will be described with reference to the accompanying drawings. However, the scope of the application is not limited thereto or restricted thereby. Like reference numerals in the drawings refer to like elements throughout.

Figure 1:
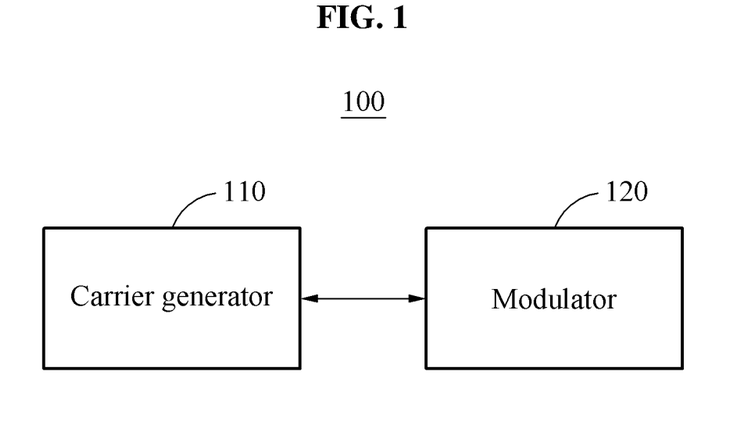
FIG. 1 is a diagram illustrating a multicarrier transmission apparatus according to an example embodiment.

FIG. 1 is a diagram illustrating a multicarrier transmission apparatus 100 according to an example embodiment.

To outperform a time delay occurring in an in-phase (I) component and a quadrature (Q) component and the effect by a phase difference occurring in transmission, the disclosure modulates an independent multicarrier signal with respect to an I component and a Q component of an optical carrier.

To this end, the multicarrier transmission apparatus 100 may include a carrier generator 110 and a modulator 120.

The carrier generator 110 generates a plurality of multicarrier signals.

The carrier generator 110 may generate the plurality of multicarrier signals in a real number form by applying a Hermitian symmetry. In detail, the carrier generator 110 may apply the Hermitian symmetry by performing inverse fast Fourier transform (IFFT) processing on a conjugate complex value acquired by performing quadrature amplitude modulation (QAM) mapping on a plurality of multicarrier signals converted in parallel.

The Hermitian symmetry is also referred to as a conjugate symmetry and corresponds to an operation of changing a sign of a complex variable. The Hermitian symmetry on Fourier transform may be described as follows. Fourier transform of a time domain real number function becomes a complex function. Here, a complex function for a transform domain is to have a characteristic of the Hermitian symmetry. Also, Fourier transform of a function having the Hermitian symmetry becomes a real number function.

That is, the plurality of multicarrier signals may be transformed to a real number form through fast Fourier transform (FFT) processing or IFFT processing.

The modulator 120 independently modulates input data with respect to the I component and the Q component using the generated plurality of multicarrier signals.

The disclosure relates to technology of transmitting and receiving a signal by generating a signal not in a complex form but in a real number form using the Hermitian symmetry and by independently modulating and demodulating the generated signal with respect to the I component and the Q component of the optical carrier.

That is, the disclosure transmits and receives a signal by modulating a multicarrier signal in an independent real number form with respect to each of the I component and the Q component of the optical carrier. Thus, the same frequency efficiency to that acquired by transmitting a multicarrier signal in a complex form according to the related art may be achieved.

In addition, the I component and the Q component of the optical carrier may be used as independent channels and thus, may not be affected by an RF time delay, a channel gain difference and an RF phase difference occurring during a signal modulation and demodulation process.

Similar to general coherent optical reception, due to an optical phase difference between an optical carrier and an optical carrier of a local oscillation laser of a receiver, interference may occur between I and Q components after a signal is received at a reception side.

Accordingly, when modulating the generated plurality of multicarrier signals, the modulator 120 modulates the input data by inserting an RF tone separate from the I component and the Q component.

That is, when modulating a signal with respect to the I component or the Q component of the optical carrier, the modulator 120 may insert an additional RF tone. The reception side may independently receive the I component and the Q component of the optical carrier and may compensate for a phase difference using a power ratio of the additionally inserted RF tone. In this manner, inter-signal interference may be simply reduced.

Using the multicarrier transmission apparatus 100, a coherent optical transmission system may decrease the effect by a channel gain difference, a time delay and a phase difference occurring in the I component and the Q component. Also, it is possible to reduce technical requirements of an optical transmission and reception module required at the multicarrier coherent optical transmission disclosure, and it is possible to control interference between the I component and the Q component of the optical carrier by providing transmission and reception technology through simple digital signal processing. Accordingly, the multicarrier transmission apparatus 100 may be applicable to a next generation optical subscriber network system based on coherent optical transmission.

Figure 2:
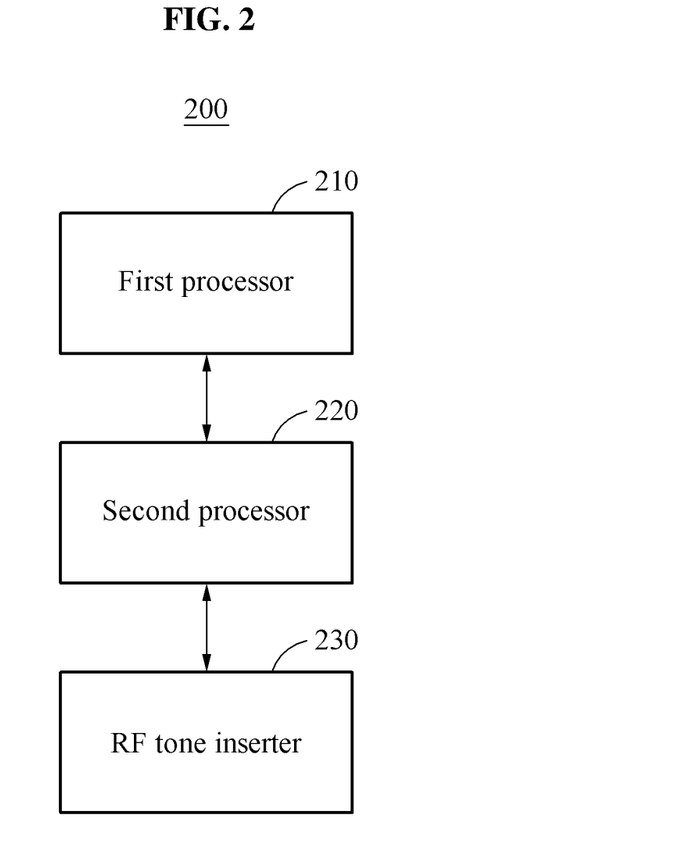
FIG. 2 is a diagram illustrating a multicarrier transmission apparatus according to another example embodiment.

FIG. 2 is a diagram illustrating a multicarrier transmission apparatus 200 according to another example embodiment.

The disclosure may decrease the effect by an RF time delay, a channel gain difference and an RF phase difference. Also, the disclosure may independently modulate an input signal with respect to an I component and a Q component of an optical carrier to reduce the effect by the RF time delay, channel gain difference and phase difference.

To this end, the multicarrier transmission apparatus 200 includes a first processor 210, a second processor 220, and an RF tone inserter 230.

The first processor 210 generates first modulation data by modulating at least a portion of input data using a first carrier signal in an independent real number form with respect to the I component of the optical carrier.

The second processor 220 generates second modulation data by modulating at least a portion of the input data using a second carrier signal in an independent real number form with respect to the Q component of the optical carrier.

The first modulation data and the second modulation data may correspond to the I component and the Q component, respectively.

The RF tone inserter 230 may insert an RF tone by adding to the RF tone to the first modulation data and the second modulation data.

The disclosure relates to transmitting and receiving a signal by independently modulating and demodulating the signal with respect to the I component and the Q component of the optical carrier.

The disclosure transmits and receives a signal by modulating a multicarrier signal in an independent real number form with respect to each of the I component and the Q component of the optical carrier. Thus, the same frequency efficiency to that acquired by transmitting a multicarrier signal in a complex form according to the related art may be achieved. In addition, the I component and the Q component of the optical carrier may be used as independent channels and thus, may not be affected by an RF time delay and an RF phase difference occurring during a signal modulation and demodulation process. Also, once a signal is received at a reception side, interference may occur between the I component and the Q component of the optical carrier. The RF tone inserter 230 may insert the RF tone in addition to a signal band, which may lead to reducing interference. In detail, when the RF tone inserter 230 inserts the additional RF tone in modulating a signal with respect to the I component or the Q component of the optical carrier, the reception side may independently receive the I component and the Q component of the optical carrier and may compensate for a phase variation of optical carrier using a power ratio of the additionally inserted RF tone. In this manner, inter-signal interference may be simply reduced.

According to example embodiments, it is possible to stably transmit a signal by compensating for an optical phase difference occurring during coherent optical transmission and reception, using an RF tone. In addition, by reducing technical requirements required at an expensive coherent optical transmission and reception module, it is possible to easily apply the coherent optical transmission disclosure generally used for long distance transmission to a subscriber network.

Figure 3:
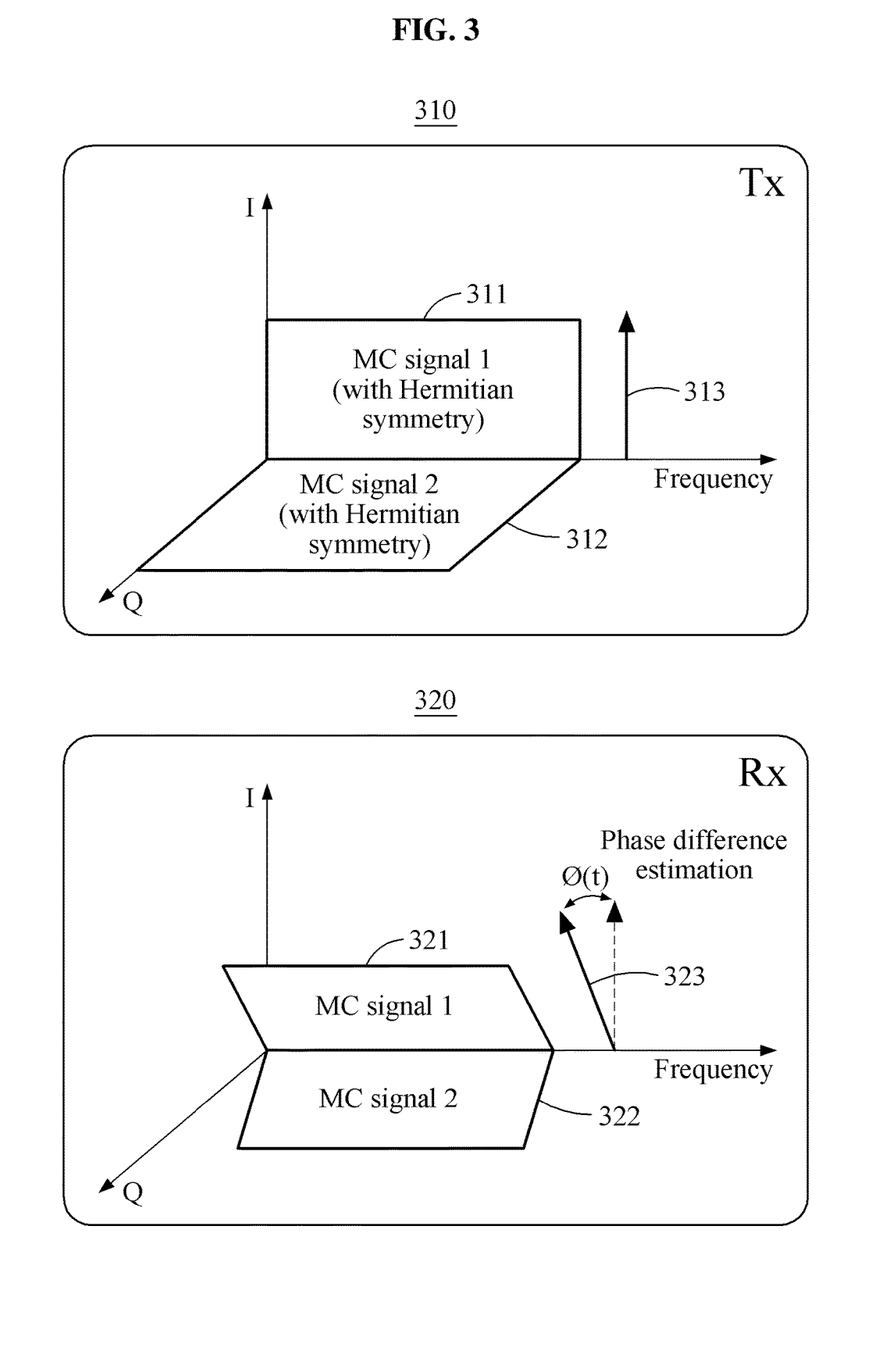
FIG. 3 illustrates a dual multicarrier transmission concept of transmitting a signal by separating an in-phase (I) component and a quadrature (Q) component.

FIG. 3 illustrates a dual multicarrier transmission concept of transmitting a signal by separating an I component and a Q component.

A graph 310 shows multicarrier signals 311 and 312 and an RF tone 313 of a transmission side.

The transmission side may modulate input data using the independent multicarrier signals (MC signal 1 and MC signal 2) 311 and 312 with respect to an I component and a Q component, respectively. Also, to reduce interference between the I component and the Q component that may occur on a reception side, the transmission side may further insert the RF tone 313. The RF tone 313 may be present in the same dimension as the MC signal 1 311 on an I component axis.

A graph 320 shows a multicarrier signal (MC signal 1) 321, a multicarrier signal (MC signal 2) 322, and an RF tone 323 of a reception side.

Due to a time delay occurring in the I component and the Q component and the effect by a phase difference according thereto, the multicarrier signals, for example, the MC signal 1 311 and the MC signal 2 312, and the RF tone 313 of the transmission side are changed to the multicarrier signals, for example, the MC signal 1 321 and the MC signal 2 322, and the RF tone 323 of the reception side.

A phase variation of optical carrier may be compensated for using a power ratio between the RF tone 313 and the RF tone 323, which will be described with reference to FIG. 5.

Figure 4A:
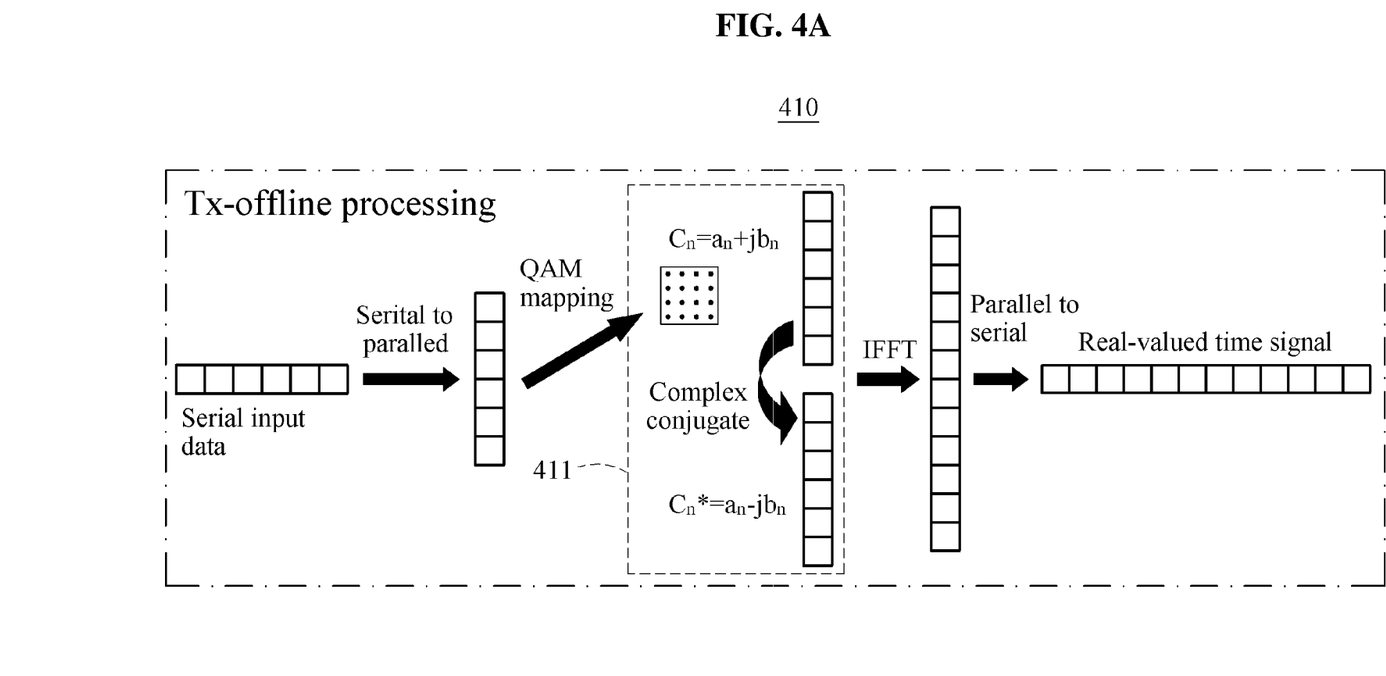
FIG. 4A illustrates a transmission side of generating a signal in a real number form using a Hermitian symmetry.

FIG. 4A illustrates a transmission side 410 of generating a signal in a real number form using a Hermitian symmetry.

The transmission side 410 converts input data from a serial form to a parallel form. Also, the transmission side 410 modulates the parallel input data.

Here, a variety of modulation schemes may be applicable. For example, the transmission side 410 may perform QAM mapping on the parallel input data.

Hermitian symmetry processing may be performed on the QAM mapped input data through a process 411.

In detail, through the process 411, the QAM mapped input data may be converted from a form of '$c_n = a_n + jb_n$,' to a conjugate complex value '$c_n = a_n - jb_n$.'

Also, the conjugate complex processed input data may be converted to a serial from through IFFT processing and thereby transmitted.

Figure 4B:
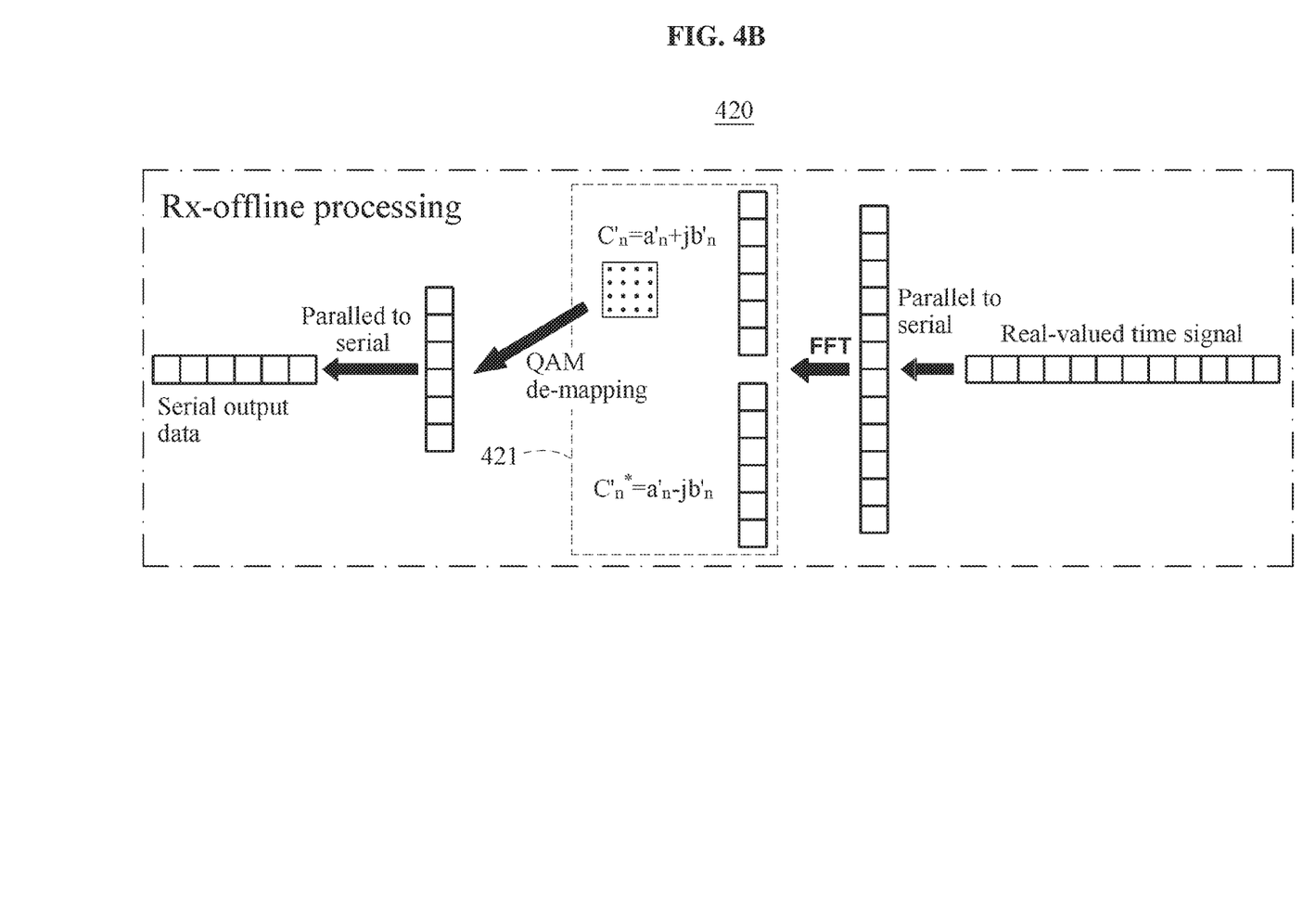
FIG. 4B illustrates a reception side of generating a signal in a real number form using a Hermitian symmetry.

FIG. 4B illustrates a reception side 420 of generating a signal in a real number form using a Hermitian symmetry.

The reception side 420 receives serial input data, converts a form of the serial input data to a parallel form, and performs FFT processing. Hermitian symmetry processing may be performed on the FFT processed input data through a process 421.

Through the process 421, the input data may be converted from a form of '$c_n = a_n - jb_n$,' to a conjugate complex value '$c_n = a_n + jb_n$,' and QAM de-mapping may be performed on the converted input data. Also, the QAM de-mapped data may be output in a serial form and thus, may be demodulated to be the same form as the input data.

Figure 5:
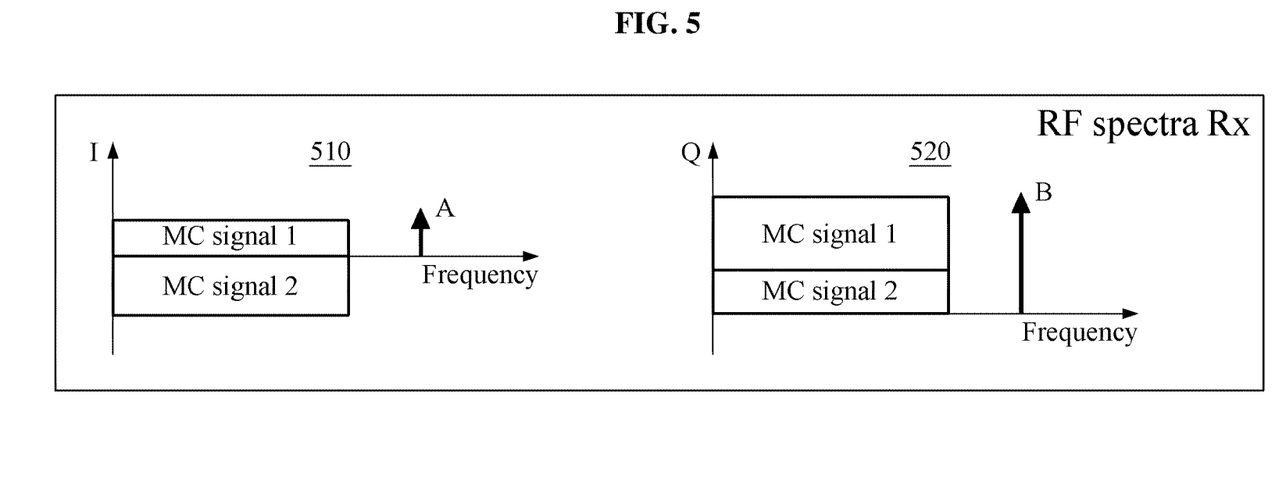
FIG. 5 illustrates interference between an I component and a Q component occurring in response to receiving a coherent light.

FIG. 5 illustrates interference between an I component and a Q component occurring in response to receiving a coherent light.

The disclosure relates to reducing interference between the I component and the Q component by inserting an RF tone in addition to a signal band. The inter-signal interference may be reduced by inserting an additional RF tone when modulating a signal with respect to the I component or the Q component of the optical carrier and by independently receiving the I component and the Q component at a reception side and then compensating for a phase variation of optical carrier using a power ratio of the additionally inserted RF tone.

A graph 510 shows multicarrier signals and an RF tone corresponding to the I component, and a graph 520 shows multicarrier signals and an RF tone corresponding to the Q component.

The reception side may complement received data by estimating Q(t) according to Equation 1.

$$Q(t) = \tan\left(\frac{B}{A}\right) \qquad \text{[Equation 1]}$$

In Equation 1, B denotes a magnitude of the RF tone corresponding to the Q component and A denotes a magnitude of the RF tone corresponding to the I component.

That is, Q(t) corresponds to a tangent value to which a ratio of B to A is applied.

Herein, received data is complemented based on the calculated Q(t) according to Equation 2.

$$Rx = MC1 + jMC2$$

$$R'x = Rx^* \exp(-j\Phi(t))$$

$$MC1' = Re(R'x)$$

$$MC2' = Im(R'x) \qquad \text{[Equation 2]}$$

In Equation 2, MC1 denotes a multicarrier corresponding to the I component, MC2 denotes a multicarrier corresponding to the Q component, MC1' denotes a real number value of R'x and MC2' denotes an imaginary number value of R'x.

Figure 6:
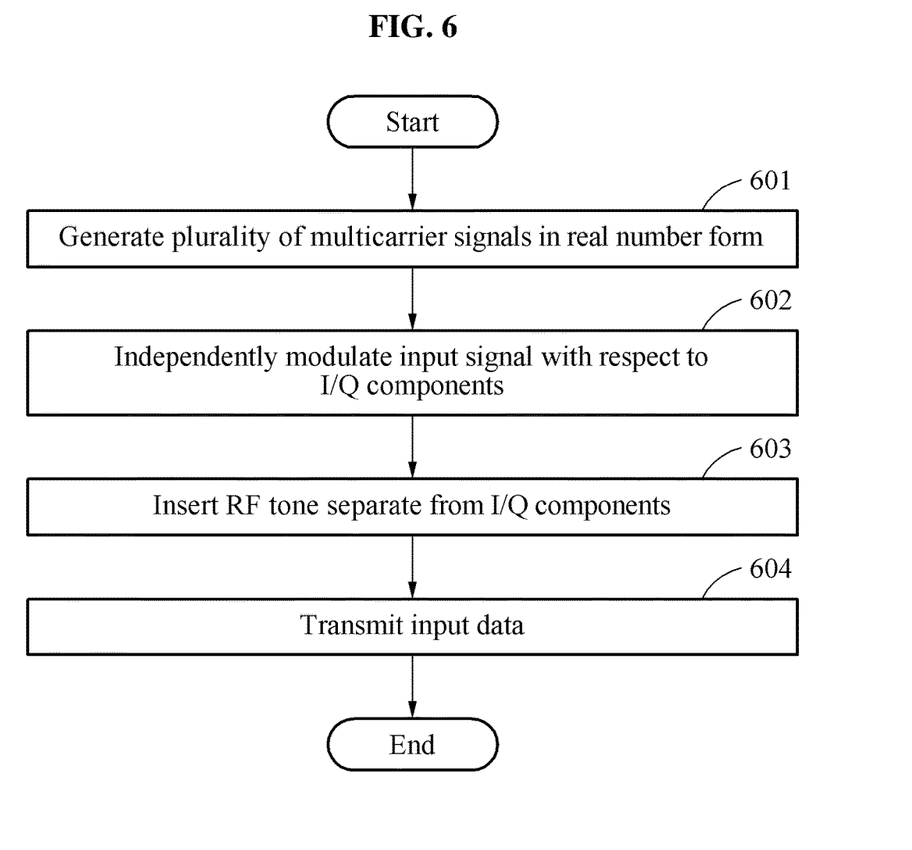
FIG. 6 is a flowchart illustrating a multicarrier transmission method according to an example embodiment.

FIG. 6 is a flowchart illustrating a multicarrier transmission method according to an example embodiment.

In operation 601, the multicarrier transmission method generates a plurality of multicarrier signals in a real number form.

For example, the multicarrier transmission method may generate a plurality of multicarrier signals in a real number form by applying a Hermitian symmetry.

In detail, to generate the plurality of multicarrier signals in the real number form, the multicarrier transmission method may perform IFFT processing on a conjugate complex value acquired by performing QAM mapping on the plurality of multicarrier signals converted in parallel.

In operation 602, the multicarrier transmission method independently modulates input data with respect to an I component and a Q component. For example, the multicarrier transmission method may generate first modulation data by modulating at least a portion of the input data using a first carrier signal in an independent real number form with respect to the I component of the optical carrier and may generate second modulation data by modulating at least a portion of the input data using a second carrier signal in an independent real number form with respect to the Q component of the optical carrier.

In operation 603, the multicarrier transmission method inserts an RF tone separate from the I component and the Q component.

In operation 604, the multicarrier transmission method transmits the input data in which the RF tone is inserted. A reception side may compensate for a phase variation of optical carrier based on a power ratio of the reception side to the inserted RF tone.

According to example embodiments, it is possible to reduce technical requirements of an optical transmission and reception module required at a multicarrier coherent optical transmission scheme. Also, as a transmission and reception scheme through simple digital signal processing (DSP), it is possible to control interference between an I component and a Q component of an optical carrier by providing transmission and reception technology through digital signal processing, and it is possible to apply to a next generation optical subscriber network system based on coherent optical transmission.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical discs and floptical disks; and hardware devices that are specially configured to store and perform program instructions, such as read-only memory (ROM), random access memory (RAM), flash memory), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A multicarrier transmission apparatus at least temporarily configured by a computer, the multicarrier transmission apparatus comprising:
    a carrier generator configured to generate two multicarrier signals; and
    a modulator configured to independently modulate input data with respect to an in-phase (I) component and a quadrature (Q) component of an optical carrier using the generated two multicarrier signals,
    wherein the modulator is configured to modulate the input data by inserting a radio frequency (RF) tone separate from the I component and the Q component, and
    wherein a phase variation of the optical carrier is compensated at a reception apparatus using a tangent value of a ratio between a size of the RF tone corresponding to the I component and a size of the RF tone corresponding to the Q component.

2. The multicarrier transmission apparatus of claim 1, wherein the carrier generator is configured to generate the two multicarrier signals in a real number form by applying a Hermitian symmetry.

3. The multicarrier transmission apparatus of claim 1, wherein the carrier generator is configured to apply the Hermitian symmetry by performing inverse fast Fourier transform (IFFT) processing on a conjugate complex value acquired by performing quadrature amplitude modulation (QAM) mapping on the two multicarrier signals converted in parallel.

4. A multicarrier transmission apparatus at least temporarily configured by a computer, the multicarrier transmission apparatus comprising:
    a first processor configured to generate first modulation data by modulating at least a portion of input data by applying a first carrier signal in an independent real number form to an in-phase (I) component of an optical carrier;

a second processor configured to generate second modulation data by modulating at least a portion of the input data by applying a second carrier signal in an independent real number form to a quadrature (Q) component of the optical carrier; and a radio frequency (RF) tone inserter configured to insert an RF tone by adding the RF tone to the first modulation data and the second modulation data, wherein a phase variation of the optical carrier is compensated at a reception apparatus using a tangent value of a ratio between a size of the RF tone corresponding to the I component and a size of the RF tone corresponding to the Q component.

5. A multicarrier transmission method at least temporarily configured by a computer, the method comprising:

generating two multicarrier signals; and independently modulating input data with respect to an in-phase (I) component and a quadrature (Q) component of an optical carrier using the generated two multicarrier signals, wherein independently modulating the input data comprises:

modulating the input data by inserting a radio frequency (RF) tone separate from the I component and the Q component, and wherein a phase variation of the optical carrier is compensated at a reception apparatus using a tangent value of a ratio between a size of the RF tone corresponding to the I component and a size of the RF tone corresponding to the Q component.

6. The method of claim 5, wherein the generating of the two multicarrier signals comprises generating the two multicarrier signals in a real number form by applying a Hermitian symmetry.

7. A non-transitory computer-readable recording medium storing a program to implement the method of claim 5.

8. The method of claim 6, wherein the generating of the two multicarrier signals in the real number form comprises performing inverse fast Fourier transform (IFFT) processing on a conjugate complex value acquired by performing quadrature amplitude modulation (QAM) mapping on the two multicarrier signals converted in parallel.

9. A non-transitory computer-readable recording medium storing a program at least temporarily configured by a computer, wherein the program comprises:

a set of instructions configured to generate two multicarrier signals; and a set of instructions configured to independently modulate input data with respect to an in-phase (I) component and a quadrature (Q) component of an optical carrier using the generated two multicarrier signals, wherein the set of instructions configured to independently modulate the input data comprises:

a set of instructions configured to modulate the input data by inserting a radio frequency RF tone separate from the I component and the Q component, and wherein a phase variation of the optical carrier is compensated at a reception apparatus using a tangent value of a ratio between a size of the RF tone corresponding to the I component and a size of the RF tone corresponding to the Q component.

* * * * *